(12) United States Patent
Ganard

(10) Patent No.: US 6,209,533 B1
(45) Date of Patent: Apr. 3, 2001

(54) SMOKER GRILL WITH SIDE-MOUNTED SMOKESTACK

(75) Inventor: John Ganard, New Braunfels, TX (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 09/372,940

(22) Filed: Aug. 12, 1999

(51) Int. Cl.⁷ ........................................ A47J 37/00
(52) U.S. Cl. .................. 126/25 R; 126/276; 99/482
(58) Field of Search .................. 126/9 R, 9 B, 126/25 R, 318, 276; 99/482, 449

(56) References Cited

U.S. PATENT DOCUMENTS

| | | | | |
|---|---|---|---|---|
| 745,618 | * | 12/1903 | Hubbs | 126/318 |
| 858,872 | * | 7/1907 | Kimmel | 126/25 R |
| 2,568,022 | * | 9/1951 | Parker | 126/25 R |
| 2,790,380 | * | 4/1957 | Shryack | 126/25 R |
| 2,867,208 | * | 1/1959 | True et al. | 126/25 R |
| 4,665,891 | * | 5/1987 | Nemec et al. | 99/447 |

* cited by examiner

Primary Examiner—James C. Yeung
(74) Attorney, Agent, or Firm—James W. Kayden; Thomas, Kayden, Horstemeyer & Risley

(57) ABSTRACT

A preferred embodiment of the smoker grill of the present invention incorporates a smoker chamber and a firebox. The smoker chamber defines a smoker interior, which is adapted for receiving food items for smoking, and includes an opening for providing access to the smoker interior. The firebox engages in fluid communication with the smoker interior so that smoke produced within the firebox can flow into the smoker interior for smoking the food items placed therein. Preferably, the firebox is sized and shaped so that it is insertable through the opening and into the smoker interior. In embodiments so configured, the firebox may be placed within the smoker interior, such as during shipping of the smoker grill, thereby allowing components of the grill to be stored and shipped in a container that is smaller than could otherwise be utilized. Method aspects also are provided.

3 Claims, 4 Drawing Sheets

SMOKER GRILL WITH SIDE-MOUNTED SMOKESTACK

BACKGROUND OF THE INVENTION

1. Field of the Invention

The present invention relates generally to barbecue grills and, more particularly, to grills for smoking food items.

2. Description of the Related Art

Food items, such as meat, fish, etc., are commonly smoked by placing the items in a container or smoke box wherein the smoke from smoldering wood, such as hickory, mesquite, etc., is provided. The smoldering wood emits an aromatic smoke which fills the smoke box and which imparts a distinctive smoked flavor to the food items. Such devices typically operate at a relatively low temperature and, in order to ensure complete cooking, for the smoked flavor to deeply penetrate the food items, and develop to a desirable flavor intensity, the wood is allowed to smolder for prolonged periods of time, i.e. several hours. The food items are thus continuously surrounded, flavored and cooked by the smoke and heat created by the wood.

Many prior art devices for smoking food items, known as smokers, exist which typically include a smoker chamber for containing the food items and a firebox which communicates with the interior of the smoker chamber. The firebox is configured for containing smoldering wood and is adapted to provide a suitable amount of smoke to the interior of the smoker chamber for smoking the food items. Heretofore, it has been commonplace to provide an exhaust or smokestack at a location along the smoker chamber that is interior of one of its end walls, such as on an upper surface of the smoker chamber, that promotes a flow of smoke from the firebox, through the interior of the smoker chamber, and upwardly through the smokestack. Thus, the smokestack cooperates with the firebox to provide an air flow (and its accompanying smoke) within the smoker that tends to surround the food items that are placed within the smoker chamber between the firebox and the smokestack.

However, for food items placed within the smoker chamber at locations on the opposite side of the smokestack from the firebox, smoking of these food items can be more difficult, i.e. more time consuming, as those locations within the smoker chamber tend to coincide with a relatively cool location within the smoker chamber. This cool location or "cold zone" typically is created by the air flow pattern within the smoker chamber that tends to flow across the interior of the smoker chamber from the firebox and then upwardly into the smokestack without flowing to the end wall of the smoker chamber. Thus, in a typical prior art smoker, approximately six to eight inches extending inwardly from the end wall along the length of the smoker chamber is particularly undesirable for use. This cold zone also may tend to maintain a less dense smoke, on average, than other locations within the smoker chamber.

Additionally, the placement of the smokestack on the upper surface of the smoker chamber typically has resulted in an inability to increase the size of the opening of the smoker chamber, through which the food items are placed into the smoker interior, because the door utilized to cover the opening is designed so as not to impinge the smokestack. This configuration, however, oftentimes results in an opening of the smoker chamber which is capable of receiving a smaller food item than would normally fit within the interior of the smoker chamber if a larger opening were provided.

Therefore, there is a need for smoker grills which address these and other shortcomings of the prior art.

BRIEF SUMMARY OF THE INVENTION

Briefly described, the present invention comprises a smoker grill incorporating a smoker chamber and a firebox. The smoker chamber defines a smoker interior, which is adapted for receiving food items for smoking, and includes an opening for providing access to the smoker interior. The firebox engages in fluid communication with the smoker interior so that smoke produced within the firebox can flow into the smoker interior for smoking the food items placed therein. Preferably, the firebox is sized and shaped so that it is insertable through the opening and into the smoker interior. In embodiments so configured, the firebox may be placed within the smoker interior, such as during shipping of the smoker grill, thereby allowing the grill components to be stored and shipped in a container that is smaller than could otherwise be utilized.

In accordance with another aspect of the present invention, some embodiments incorporate a smoker chamber which includes first and second end walls, with the first end wall being adapted to mount the firebox, and the second end wall being adapted to mount a smokestack. Preferably, the smokestack is mounted at an upper portion of the second end wall so that smoke from the firebox is drawn into and across the length of the smoker interior, and then outwardly through the smokestack.

In accordance with another aspect of the present invention, some embodiments incorporate a smoker chamber defining a smoker interior and having an opening formed therethrough, with the opening providing access to the smoker interior. A firebox defining a firebox interior also is provided, with the firebox interior engaging in fluid communication with the smoker interior so that smoke formed within said firebox can enter the smoker interior. Additionally, means for exhausting smoke from the smoker interior is provided.

In accordance with still another aspect of the present invention, a preferred method includes: providing a container sized and shaped to receive therein the smoker chamber of a smoker grill; inserting the smoker chamber within the container; inserting the firebox through the opening of the smoker chamber and into the smoker interior; and, sealing the container. Preferably, the smoker chamber has a movable lid attached thereto, with the lid being movable between an open position and a closed position, and the step of inserting the firebox through the opening includes moving the lid to the closed position after the firebox is inserted into the smoker interior.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
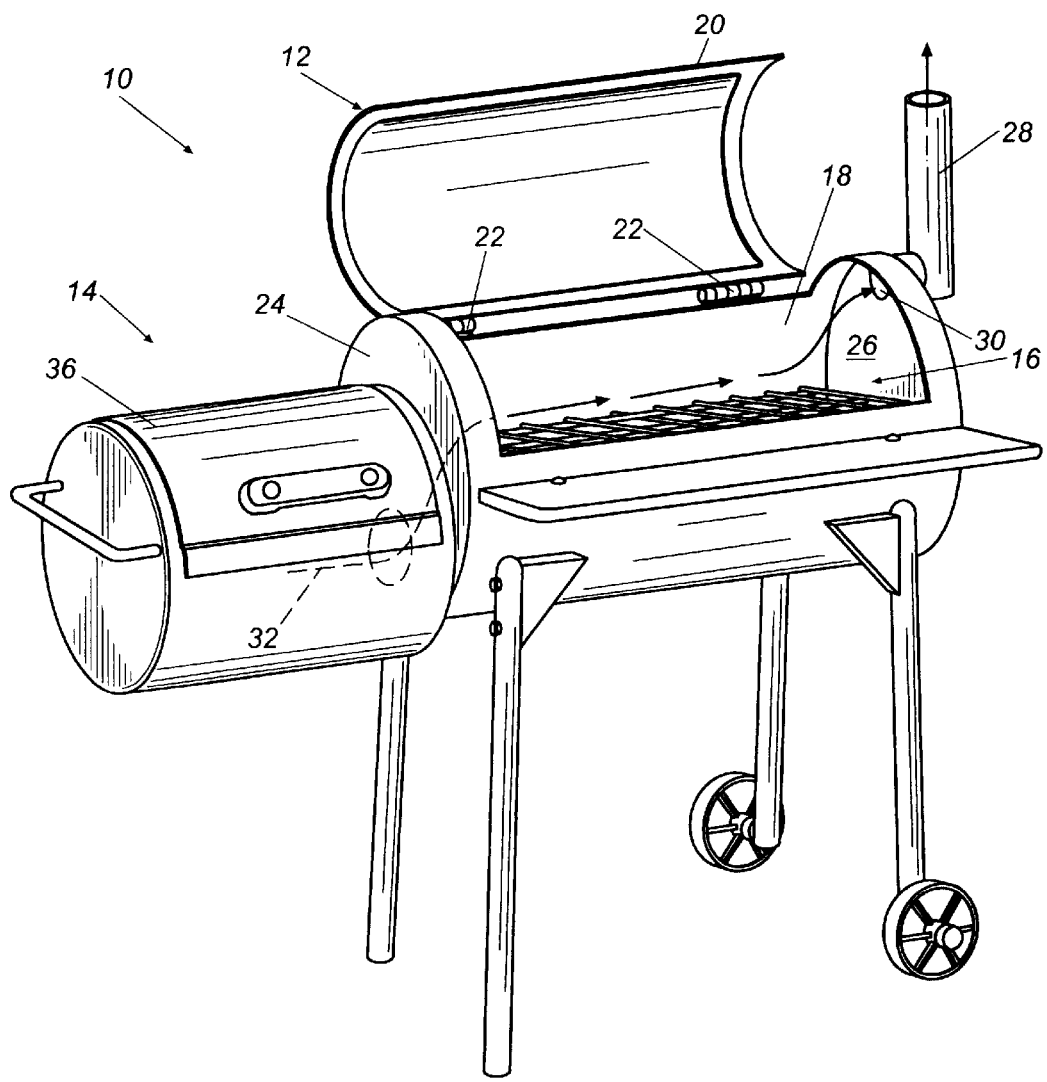
FIG. 1 is a perspective view of a preferred embodiment of the present invention showing a representative air flow through the smoker chamber.

Reference will now be made in detail to the description of the invention as illustrated in the drawings with like numerals indicating like parts throughout the several views. As shown in FIG. 1, a preferred embodiment of the smoker grill 10 of the present invention incorporates a smoker chamber 12 and a firebox 14. The smoker chamber defines an interior 16 into which various food items may be placed for smoking. Access to the interior 16 is provided by an opening 18, which typically is formed in an upper portion of the smoker chamber. An access door or lid 20 also is provided for enclosing the opening 18 when in a closed position. Typically, one or more hinges 22 are provided for allowing the lid to move between its closed position (not shown) and an open position, such as shown in FIG. 1. Preferably, the lid is configured so that the hinges are positioned behind a centerline of the smoker chamber, i.e. the lid spans an arc of at least approximately 90°, and includes a portion which spans the centerline or peak of the grill.

As depicted in FIG. 1, smoker chamber 12 preferably incorporates opposing end walls 24 and 26, with the firebox 14 being mounted to end wall 24, and a smokestack 28 preferably being mounted to end wall 26. Smokestack 28 cooperates with the interior of the smoker chamber through an exhaust orifice 30, which preferably is formed in an upper portion of the end wall 26. In those embodiments incorporating an end wall-mounted smokestack, the end wall preferably includes a flat or planar portion at least in the area of attachment of the smokestack that is adapted to receive a complimentary shaped, preferably flat, end portion of the smokestack. So positioned, the smokestack draws smoke (depicted with arrows), from the firebox 14, through a smoke inlet 32 formed in the end wall 24, into and across the length of the interior 16, and then outwardly through the exhaust orifice and smokestack. Thus, positioning the smokestack and its exhaust orifice at an upper end of the smoker chamber, such as at the end wall 26, beneficially provides for a more uniform flow of smoke across the various food items housed within the smoker chamber during smoking.

Figure 2:
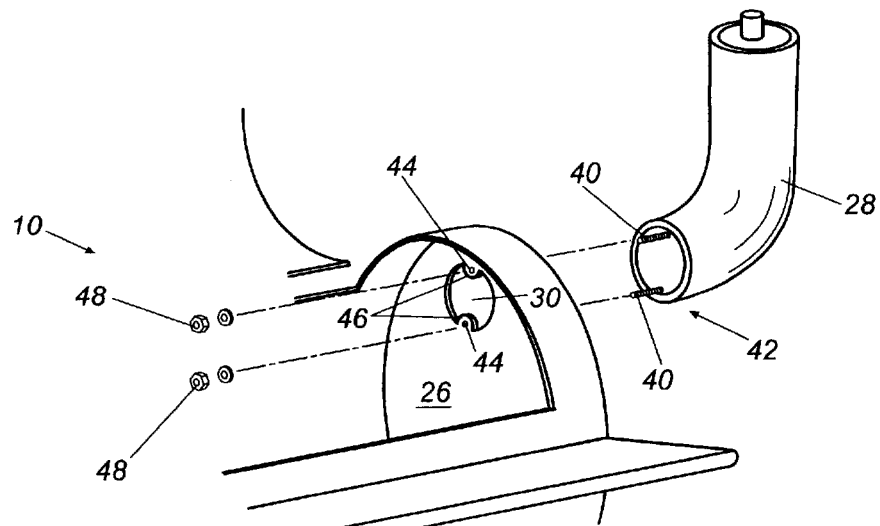
FIG. 2 is a partially cut-away, partially exploded, perspective view showing assembly detail of an embodiment of the smokestack.

Typically, firebox 14 incorporates an opening which cooperates with a firebox door 36 for providing access to the opening and the firebox interior. As shown in FIGS. 1 and 2, the firebox preferably is adapted to engage the end wall 24 of the smoker chamber and incorporates an exhaust orifice, which cooperates with the smoke inlet 32 of the smoker chamber, thereby allowing the firebox interior to communicate with the smoker chamber interior.

As shown in FIG. 2, a preferred embodiment of the smokestack 28 is depicted which incorporates bolts 40 extending from a proximal end 42 thereof. Preferably, the proximal end terminates in a planar configuration, as described hereinbefore. The bolts are adapted to be inserted through holes 44 formed in the end wall 26 and, preferably, are formed through extended portions or tabs 46 which cooperate to define exhaust orifice 30. So configured, as the bolts are inserted through the holes and the proximal end of the smokestack is secured against the end wall by tightening nuts 48 upon the bolts, the tabs 46 deform toward the smokestack and tend to form a conical shape of the end wall at the area of attachment, thereby creating a tight seal of the smokestack with the smoker chamber. In some embodiments, the smokestack and/or the end wall may be painted in a powder coating process in which cases the powder coating tends to function as a gasket for aiding the sealing of the smokestack to the smoker chamber. This method of attachment provides a significant and heretofore unexpected improvement over prior art smokestack designs. Typically, such prior art designs include smokestacks which are adapted to attach to a curved, oftentimes cylindrical, surface, such as on the upper portion of the smoker chamber, where an elliptical exhaust orifice has typically been utilized. The preferred embodiment of the present invention depicted herein, however, with the smokestack being attached to the end wall which preferably is configured with a substantially flat surface, creates both an improved seal of the smokestack with the smoker chamber and an improved draw of heat and smoke through the smoker chamber.

Figure 3:
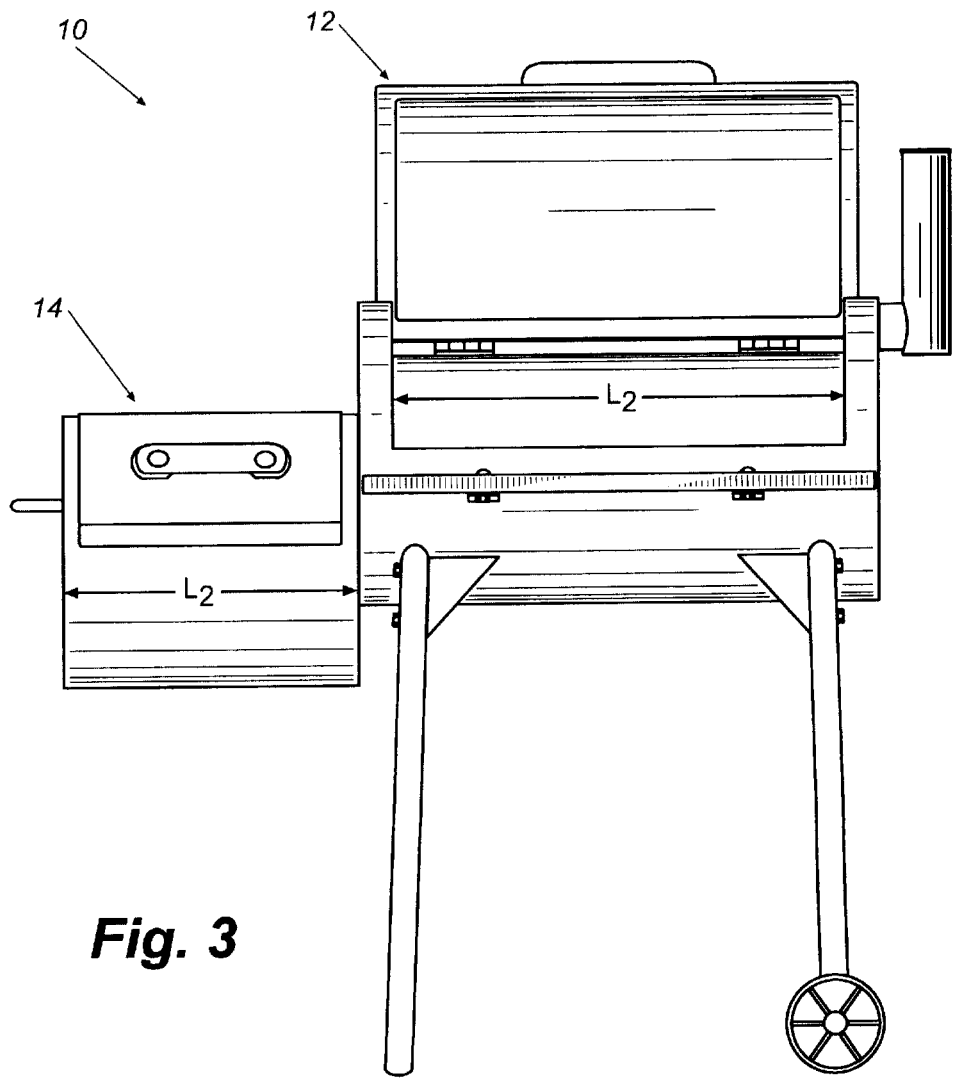
FIG. 3 is a front elevation of the embodiment depicted in FIG. 1.
Figure 4:
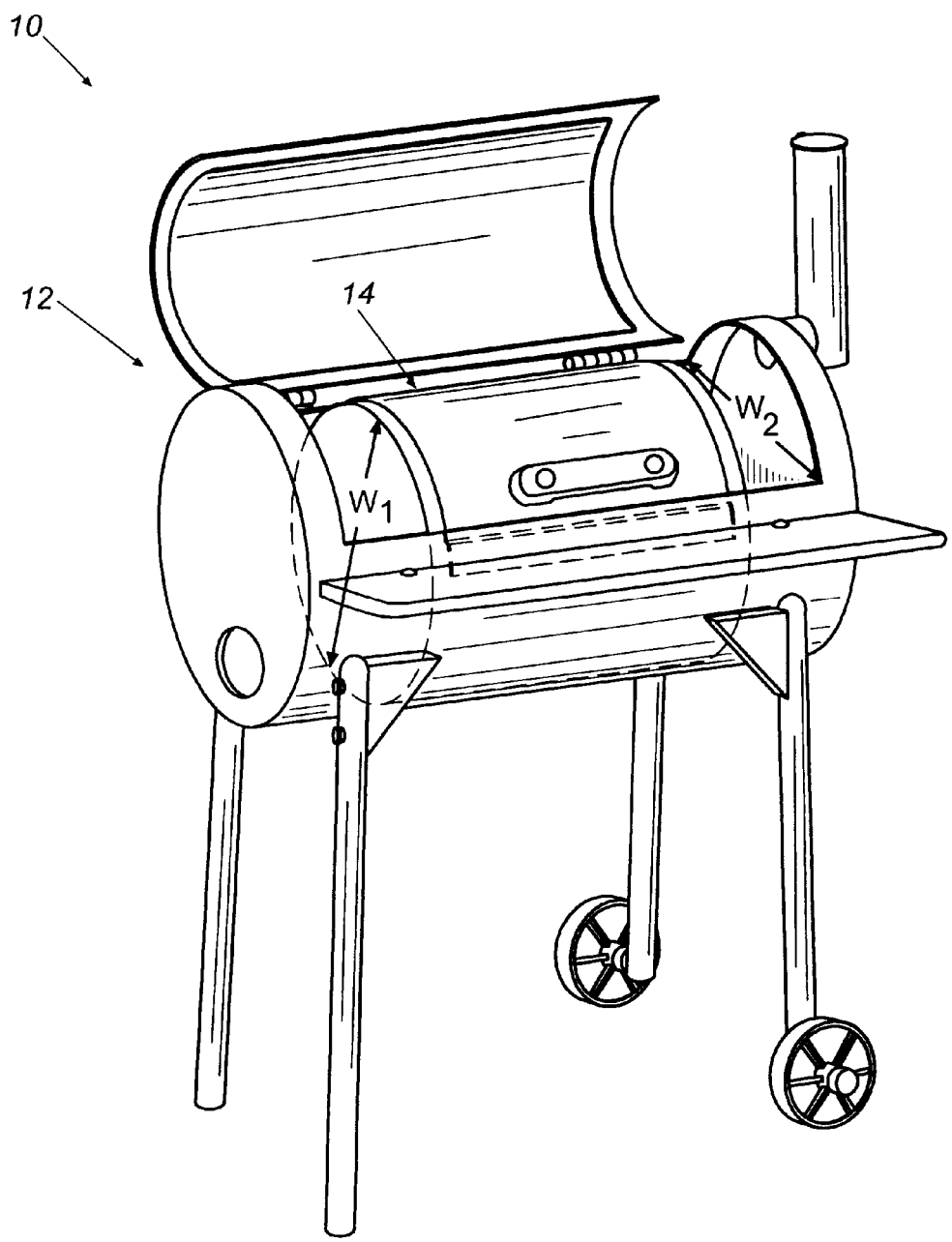
FIG. 4 is a perspective view of a partially dissembled smoker grill of the present invention with the firebox received within the smoker chamber.

Referring now to FIGS. 3 and 4, the firebox preferably is configured as a cylindrical structure with a width, or in the case of cylindrically configured embodiments, a diameter, $W_1$ and a length $L_1$. The dimensions $W_1$ and $L_1$ preferably are selected to correspond to the width $W_2$ and the length $L_2$ of the smoker chamber opening 18 so that when the smoker grill is at least partially dissembled, such as during shipping, the firebox may be received through the opening 18. So configured, a considerable savings in packaging material may be realized as the various components of the smoker grill 10 may be placed within a storage container having a much smaller size, and thus utilizing fewer square feet of material, than has previously been realized. In preferred embodiments, the firebox may be stored within the interior 16 with the lid in its closed position.

Figure 5:
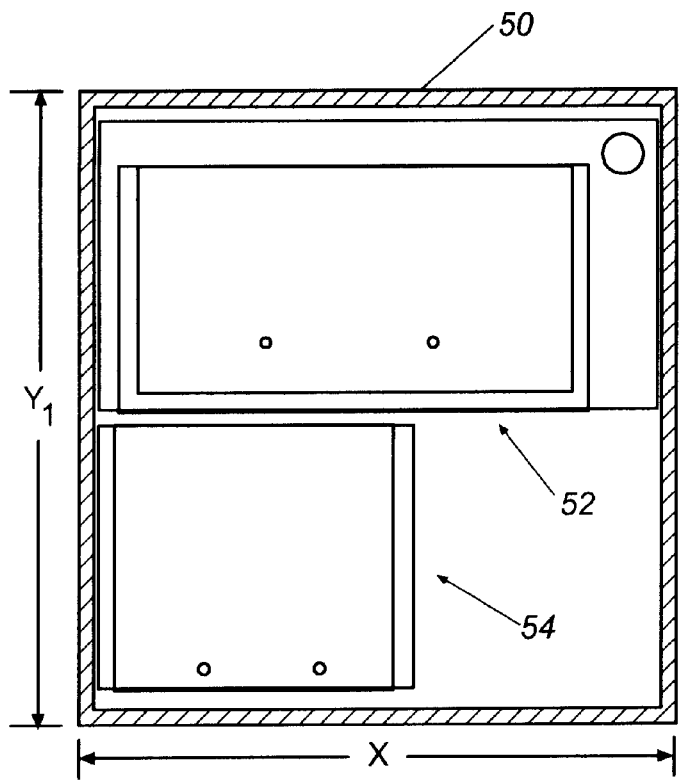
FIG. 5 is cross-sectional, top view of representative prior art smoker grill components packaged within a representative prior art shipping container.

For instance, a typical prior art arrangement of smoker grill components within a shipping container 50 is depicted in FIG. 5. Typically, the smoker chamber 52 and firebox 54 are not attached to each other during shipping and are placed adjacent each other within the container. Thus, a container having dimensions of $X \times Y_1$ is required to contain the components (it should be noted that the volumetric dimension "Z" has not been depicted in the two-dimensional drawings of FIGS. 4 and 5 for ease of description; however, the principles described herein are readily understood by one of ordinary skill in the art).

Figure 6:
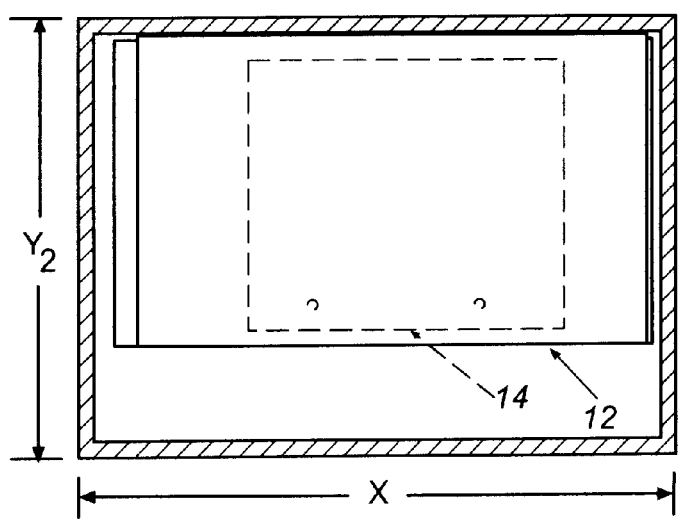
FIG. 6 is cross-sectional, top view of components of a preferred embodiment of the present invention packaged within a shipping container.

As shown in FIG. 6, a preferred embodiment of the smoker grill of the present invention may be shipped within a shipping container 60 which has substantially smaller dimensions than the shipping container 50 of FIG. 5. In particular, the container 60 has dimensions $X \times Y_2$, where $Y_2$ is shorter than $Y_1$. So configured, a cost savings in materials may be realized in the manufacture of the containers, due to the reduced material requirements. Additionally, a cost savings in transportation expenses also may be realized as a larger quantity of containers 60 can be arranged within the same volume, such as within the trailer of a truck, thereby allowing more units to be shipped per truck.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A smoker grill comprising:

a smoker chamber defining a smoker interior and having an opening formed therethrough, said opening providing access to said smoker interior;

a firebox defining a firebox interior, said firebox interior engaging in fluid communication with said smoker interior, said firebox being sized and shaped such that said firebox is insertable through said opening and into said smoker interior;

a movable lid attached to said smoker chamber, said lid being movable between an open position and a closed position, in said closed position said lid enclosing said opening, in said open position said lid providing access to said opening, said opening having a first width and a first length, said firebox having a second width and a second length, said second width being less than said first width, said second length being less than said first length such that said firebox is retainable within said smoker interior with said lid in said closed position; and further comprising a smokestack having bolts extending outwardly from an end thereof, and wherein said smoker chamber has first and second end walls, said first end wall having an exhaust orifice formed therethrough at an upper portion thereof, said exhaust orifice being adapted to cooperate with said smokestack, said exhaust orifice being at least partially defined by first and second tabs, said first and second tabs being deformable and being adapted to bend outwardly from said first end wall and toward said smokestack in response to being mechanically fastened to said bolts such that said first and second tabs engage said smokestack and form a seal therewith.

2. The smoker grill of claim 1, wherein said second end wall is adapted to mount said firebox.

3. The smoker grill of claim 1, wherein said firebox is a cylindrical structure and said second width is further defined as a diameter.

* * * * *